United States Patent
Jacobsen

[15] 3,656,263
[45] Apr. 18, 1972

[54] ATTACHMENT FOR HOLDING A FORAGE KNIFE ON A GRINDING MACHINE

[72] Inventor: Julius A. Jacobsen, 526 East 6th Street, Sioux Falls, S. Dak. 57102

[22] Filed: June 18, 1970

[21] Appl. No.: 47,184

[52] U.S. Cl. ............................................. 51/238 R, 51/128
[51] Int. Cl. ............................................................ B24b 41/06
[58] Field of Search .................... 51/128, 102, 216, 238, 239

[56] References Cited

UNITED STATES PATENTS

| 901,059 | 10/1908 | Ball | 51/102 UX |
| 507,634 | 10/1893 | Rogers | 51/122 |

FOREIGN PATENTS OR APPLICATIONS

| 569,539 | 2/1933 | Germany | 51/102 |
| 85,911 | 7/1920 | Sweden | 51/216 |

Primary Examiner—Harold D. Whitehead

[57] ABSTRACT

This invention consists of a horizontally disposed rectangular supporting plate that is suitably secured to a grinding machine having a horizontally disposed cupped grinding wheel rotated by an electric motor, the aforesaid plate having an L-shaped lever bracket adjustably secured thereto, the said bracket having a spring-loaded pressure lever hingedly secured thereto; and wheeled means of supporting and holding a forage knife while the said knife is being sharpened by the said cupped grinding wheel.

2 Claims, 3 Drawing Figures

INVENTOR
JULIUS A. JACOBSEN

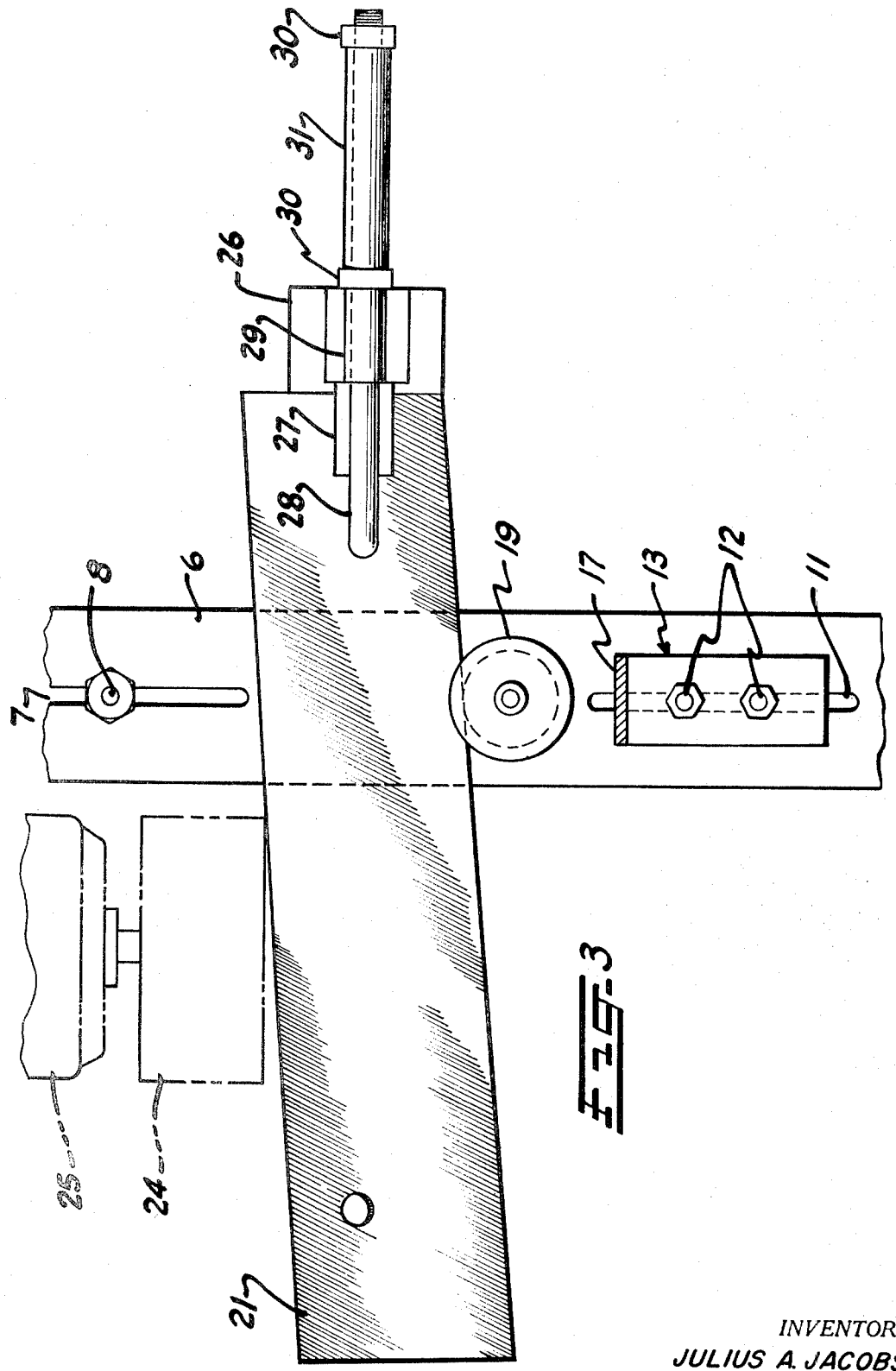

ATTACHMENT FOR HOLDING A FORAGE KNIFE ON A GRINDING MACHINE

This invention relates to grinding machines; particularly, to an attachment to a grinding machine; more particularly, to an attachment for grinding curved forage harvester knives.

For the benefit of those who are beginners in the art, forage is defined as food in the form of fodder for domestic animals, fodder being cornstalks, hay, and the like. The present invention is therefore an attachment to hold a forage cutting knife while the knife is being sharpened by the grinding machine.

It is the principal object of this invention to provide an attachment for holding a forage harvester knife on a grinding machine that will grind one edge of the knife at the required bevel, one grinding being done by a cupped grinding wheel (stone).

Another object of this invention is to provide an attachment for holding a forage harvester knife on a grinding machine that can be mounted on nearly any grinding machine having a horizontally disposed electric motor rotating a cupped grinding wheel.

Another object of this invention is to provide an attachment for holding a forage harvester knife on a grinding machine that contains a minimum number of parts.

Still another object of this invention is to provide an attachment for holding a forage harvester knife on a grinding machine, the attachment embodying a spring-loaded pressure lever having a rubber tire that presses down and thus holds the edge of the knife against the grinding wheel as the knife is moved along on rollers of the attachment.

Other and further objects and advantages of this invention will appear as the reading of this specification and its appended claims proceeds and the accompanying drawings are examined in connection therewith.

In the drawings:

FIG. 3 is a sectional top view of this invention, taken substantially along line 3—3 of FIG. 2, and viewed in the direction indicated by the arrows.

In the several views of this invention, like parts of the invention are indicated by like reference numbers.

The reference number 5 indicates this invention in its entirety.

Figure 1:
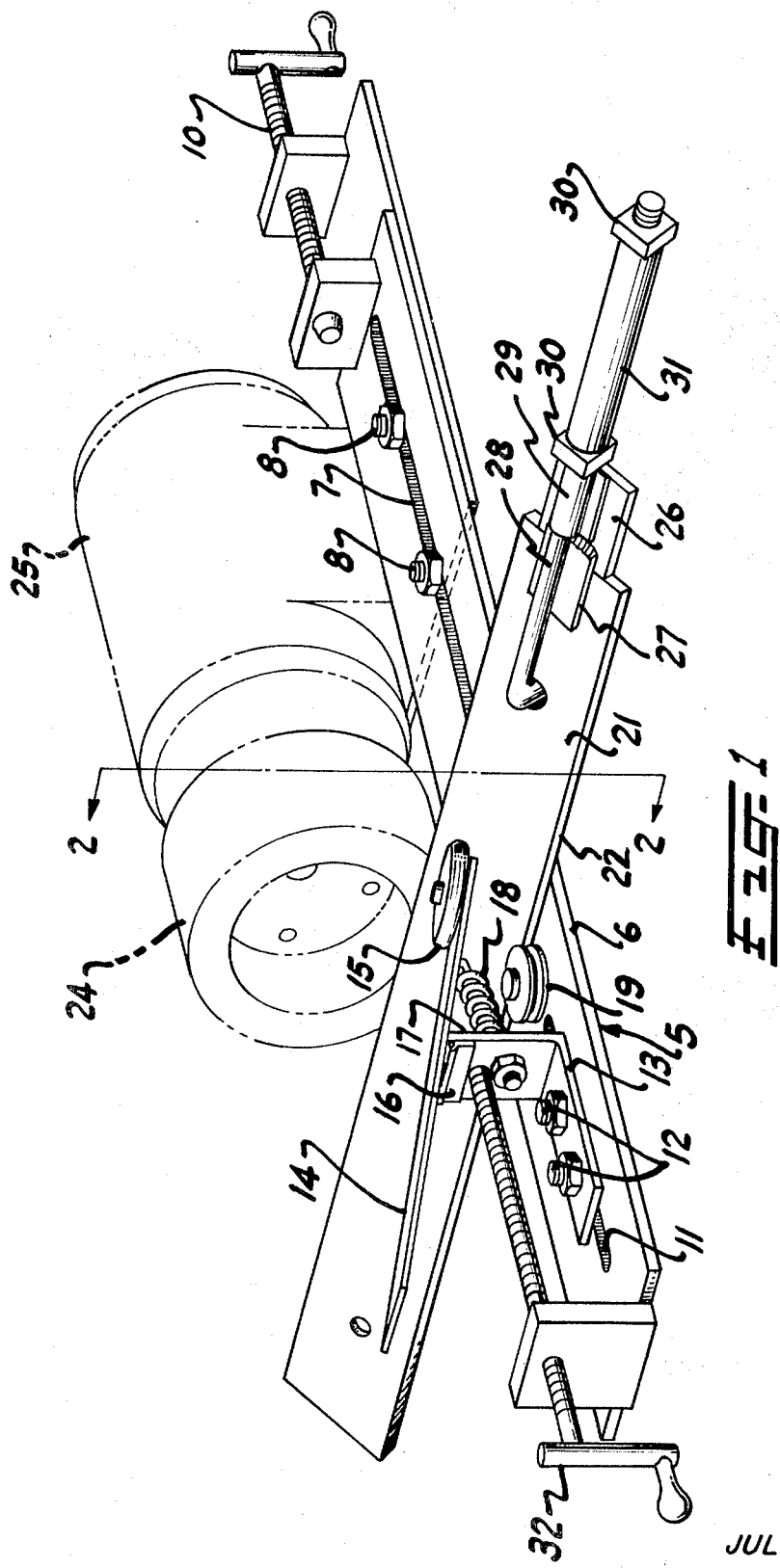
FIG. 1 is a pictorial view of this invention is use.

Directing ones attention to FIG. 1 of the accompanying drawings it will be seen that this invention 5 consists of a rectangular supporting plate 6 that is provided with a longitudinally disposed elongated opening 7 for the reception of the two upwardly extending and spaced bolts 8 that secure the invention onto the top 9 of a grinding machine. The aforesaid elongated opening 7 also permits longitudinal adjustment of the invention by means of the hand screw 10 whose details are not numbered for reasons of clarity as this part of the invention will be recognized as typical machine tool construction by those experienced in the art.

A second elongated opening 11 is located in the same aforesaid supporting plate 6 for reception of the two spaced and upwardly extending bolts 12 that secure the L-shaped lever bracket 13 to the supporting plate 6. The pressure lever 14 has a free-turning rubber wheel 15 secured to the upper surface and inner end of the lever which is mounted on a hinge 16 that is fastened by any desired means to the upper end of the vertical leg 17 of the aforesaid L-shaped lever bracket 13, as one can best see by examining FIG. 2 of the accompanying drawings. A coil spring 18 connects the underside of the aforesaid pressure lever 14 with the aforesaid vertical leg 17 of the L-shaped lever bracket 13. A free-turning grooved pulley 19 is mounted on the upper surface of the aforesaid supporting plate 6 and directly under the already mentioned coiled spring 18. A free-turning wheel 20 is mounted on the aforesaid supporting plate 6 just forward of the just mentioned grooved pulley 19 for the support of the underside of the forage knife 21 that has one edge 22 resting in the grooved periphery of the aforesaid grooved pulley 19 while the edge 23 of the knife is being sharpened by the cupped grinding wheel 24 that is rotated by the electric motor 25.

Looking again at FIG. 1 of the accompanying drawings it will be seen that one end of the aforesaid forage knife 21 has an extension 26 in the form of a rectangular piece of steel on one end thereof that is provided with a rectangular flange 27 that is secured to the upper surface and one end of the extension 26. The just mentioned flange 27 overlaps the end of the often mentioned forage knife 21. The knife is provided with an opening in which one end of the L-shaped rod 28 slidably passes through a horizontally disposed tube 29 that is welded or otherwise secured to the upper surface of the aforesaid extension 26. Two longitudinally spaced square nuts 30 and a tube 31 are located on the outer end of the aforesaid L-shaped rod 28 in the manner illustrated in FIG. 1 of the drawings. This completes the construction of this novel invention.

Although not previously mentioned, a second hand screw 32, similar to the aforesaid hand screw 10, is provided for the obtaining of longitudinal adjustment of the already described pressure lever 14, as will be understood by those experienced in the art when they have examined FIG. 1 of the accompanying drawings.

Figure 2:
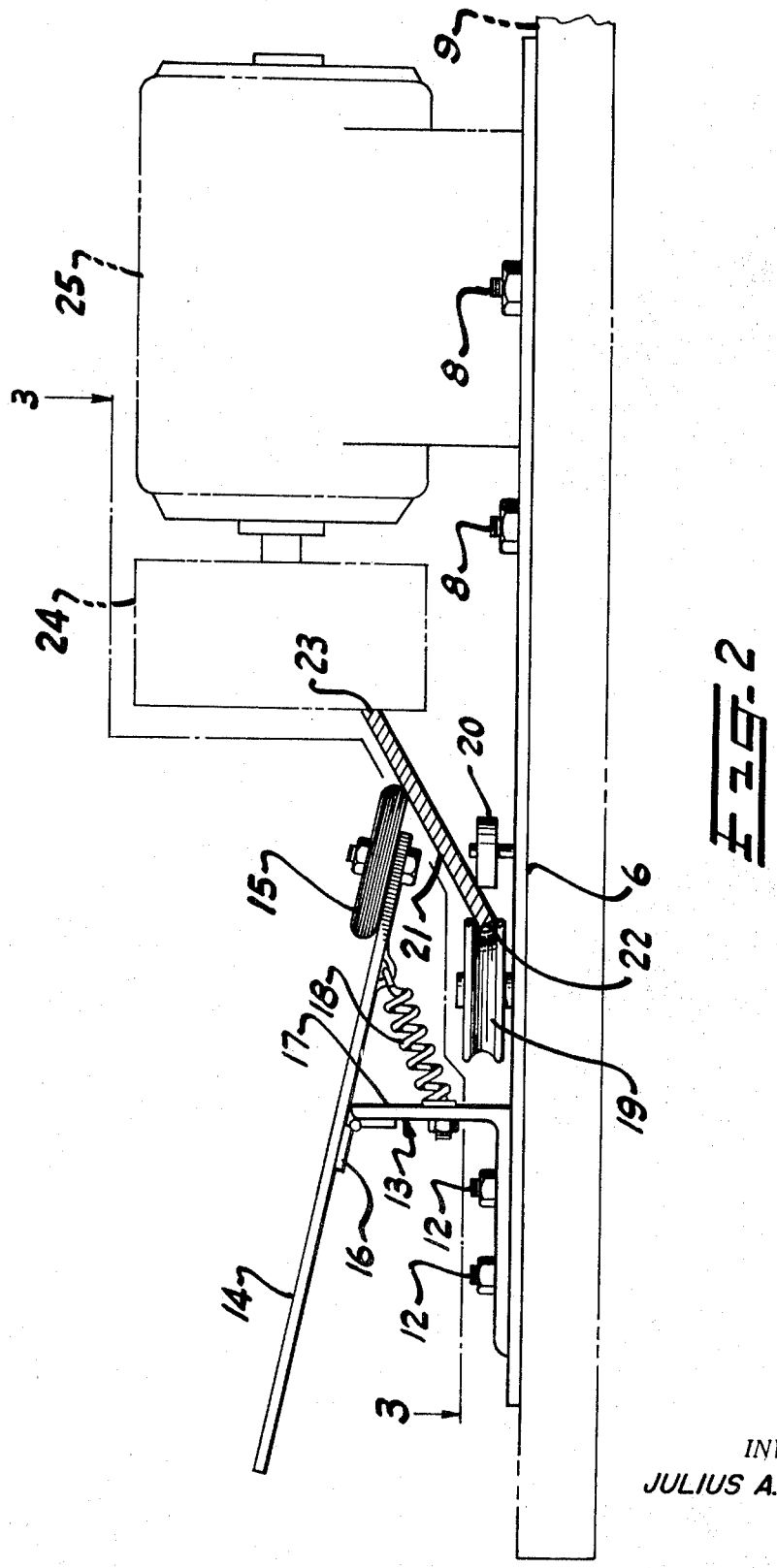
FIG. 2 is a sectional view of this invention, taken substantially along line 2—2 of FIG. 1, and viewed in the direction indicated by the arrows.

The way in which this novel invention is used is quite obvious to those experienced in the art after they have examined FIGS. 1 and 2 of the accompanying drawings, therefore nothing more need be said on this subject.

This invention is subject to any and all changes and/or modifications one may care to make in the same in so long as the changes and/or modifications all fall within the scope and intent of the appended claims.

What I now claim as new and desire to secure by Letters Patent is:

1. An attachment for holding a forage knife on a grinding machine, said attachment comprising a horizontally disposed plate having structure thereon adapted to support a forage knife that is placed on the said attachment and held by the said attachment for the sharpening of the said forage knife; said structure comprising a grooved pulley rotatably secured to said plate, against which pulley one edge of a forage knife can rest, an L-shaped lever bracket secured to said plate by means of two spaced vertically disposed bolts that extend upward through openings in said lever bracket and through an elongated opening in the said plate; a spring loaded pressure lever hingedly secured to said lever bracket; a free turning rubber wheel secured to said pressure lever, said rubber wheel pressure down on the upper surface of the forage knife as the knife is being sharpened; a free turning wheel secured to said plate, said free turning wheel located forward of the said grooved pulley to support the underside of a forage knife as the same is being sharpened.

2. The invention of claim 1, wherein both the said L-shaped lever bracket and the said horizontally disposed plate are provided with a horizontally disposed hand screw mechanism for the purpose of providing longitudinal adjustment of the said lever bracket and the said plate.

* * * * *